United States Patent
Hagihara et al.

(10) Patent No.: US 7,220,676 B2
(45) Date of Patent: May 22, 2007

(54) ROLL-OFF REDUCING AGENT

(75) Inventors: Toshiya Hagihara, Wakayama (JP); Shigeo Fujii, Wakayama (JP); Yoshiaki Oshima, Wakayama (JP)

(73) Assignee: Kao Corporation, Tokyo (JP)

( * ) Notice: Subject to any disclaimer, the term of this patent is extended or adjusted under 35 U.S.C. 154(b) by 507 days.

(21) Appl. No.: 09/842,769

(22) Filed: Apr. 27, 2001

(65) Prior Publication Data
US 2001/0051746 A1   Dec. 13, 2001

(30) Foreign Application Priority Data

| Apr. 28, 2000 | (JP) | 2000-131697 |
| Apr. 28, 2000 | (JP) | 2000-131698 |
| May 12, 2000 | (JP) | 2000-141020 |
| May 12, 2000 | (JP) | 2000-141022 |

(51) Int. Cl.
  *H01L 21/461* (2006.01)
  *C09K 13/00* (2006.01)
  *C09K 13/04* (2006.01)
(52) U.S. Cl. ............... 438/692; 252/79.1; 252/79.4
(58) Field of Classification Search ......... 438/684, 438/692; 252/79.1, 79.4, 79.2, 794; 525/79.2, 525/79.4
See application file for complete search history.

(56) References Cited

U.S. PATENT DOCUMENTS

| 3,839,536 A | * | 10/1974 | Sato et al. ............ 423/132 |
| 4,915,710 A | | 4/1990 | Miyazaki et al. ......... 51/309 |
| 5,476,606 A | * | 12/1995 | Brancaleoni et al. ...... 252/79.1 |
| 5,693,239 A | * | 12/1997 | Wang et al. ............ 216/88 |
| 5,733,819 A | | 3/1998 | Kodama et al. |
| 5,759,917 A | * | 6/1998 | Grover et al. ........... 438/690 |
| 5,783,489 A | * | 7/1998 | Kaufman et al. ......... 438/692 |
| 5,858,813 A | * | 1/1999 | Scherber et al. ......... 438/693 |
| 5,989,515 A | * | 11/1999 | Watanabe et al. ........ 423/625 |
| 6,015,506 A | * | 1/2000 | Streinz et al. .......... 252/186.1 |

(Continued)

FOREIGN PATENT DOCUMENTS

JP         A2084485         3/1990

(Continued)

OTHER PUBLICATIONS

Mravic et al , Composition for the Chemical Mechanical Polishing of Metal Layers, Jun. 17, 1999, PCT WO 99/67056, 21 pages.*

Primary Examiner—Nadine G. Norton
Assistant Examiner—Lynette T. Umez-Eronini
(74) Attorney, Agent, or Firm—Birch, Stewart, Kolasch & Birch, LLP

(57) ABSTRACT

A roll-off reducing agent comprising one or more compounds selected from the group consisting of carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof; and a roll-off reducing agent composition comprising a roll off-reducing agent comprising one or more compounds selected from the group consisting of carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof; an abrasive; and water.

14 Claims, 1 Drawing Sheet

U.S. PATENT DOCUMENTS

| | | | |
|---|---|---|---|
| 6,027,554 A | 2/2000 | Kodama et al. | |
| 6,037,260 A * | 3/2000 | Tsai et al. | 438/692 |
| 6,258,140 B1 | 7/2001 | Shemo et al. | |
| 6,309,434 B1 | 10/2001 | Ohashi et al. | |
| 6,379,406 B1 * | 4/2002 | Thomas et al. | 51/309 |
| 6,488,729 B1 | 12/2002 | Ishitobi et al. | |
| 6,569,216 B1 * | 5/2003 | Taira et al. | 51/309 |
| 6,607,571 B2 | 8/2003 | Ishitobi et al. | |
| 2003/0029095 A1 | 2/2003 | Ishitobi et al. | |

FOREIGN PATENT DOCUMENTS

| | | |
|---|---|---|
| JP | 7-70553 A | 3/1995 |
| JP | A7216345 | 8/1995 |
| JP | 9-208933 A | 8/1997 |
| JP | A9286975 | 11/1997 |
| JP | 9-316430 A | 12/1997 |
| JP | 10-88111 A | 4/1998 |
| JP | A11092749 | 4/1999 |
| JP | A2000063805 | 2/2000 |
| JP | 2001-98254 A | 4/2001 |
| JP | 2001-131535 A | 5/2001 |
| JP | 2001-155332 A | 6/2001 |
| JP | 2001-187878 A | 7/2001 |
| JP | 2001-187879 A | 7/2001 |
| JP | 2001-189296 A | 7/2001 |
| JP | 2002-12855 A | 1/2002 |
| JP | 2003-510446 A | 3/2003 |

* cited by examiner

ROLL-OFF REDUCING AGENT

BACKGROUND OF THE INVENTION

1. Field of the Invention

The present invention relates to a roll-off reducing agent. More specifically, the present invention relates to a roll-off reducing agent composition comprising the roll-off reducing agent, a process of reducing roll-off of a polished substrate by applying the roll-off reducing agent to the substrate, a process for producing a polished substrate by applying the roll-off reducing agent to the substrate, a polishing composition, a polishing process of a substrate to be polished by applying the polishing composition to the substrate, and a process for producing a substrate by applying the polishing composition to a substrate to be polished.

2. Discussion of the Related Art

Over the years, a demand for a technique for further increasing the capacity of the hard discs has become greater. As a leading means for increasing the capacity of the hard discs, there has been considered a means of producing a substrate capable of recording data even to its outer periphery by reducing roll-off (edge rounding of end side of a substrate) caused in the polishing process. For instance, various mechanical polishing conditions which can reduce roll-off, such as making a polishing pad more rigid, and making a polishing load smaller, have been studied. However, although a certain extent of an effect is obtained for reducing roll-off by these mechanical polishing conditions, the effect has not yet been satisfactory.

In addition, as a polishing composition capable of reducing roll-off, a composition comprising water, α-alumina particles and aluminum nitrate has been known (Japanese Patent Laid-Open No. Hei 9-286975). However, this composition does not have a satisfactory effect of reducing roll-off, and studies of the polishing components having an excellent effect for reducing roll-off have not yet been sufficiently made at present.

On the other hand, the hard discs have been greatly developed over the years in the trends of miniaturization and high capacity, so that the trend of high density has been progressed, that the minimum recording area has become smaller, and that the floating amount of a magnetic head has been made increasingly smaller. Therefore, there have been desired to increase the polishing rate and reduce the surface roughness, and to reduce surface defects such as scratches and pits in the polishing process of a hard disc substrate. In view of this, there have been studied on a polishing composition by using water, alumina, boehmite and a chelating compound (Japanese Patent Laid-Open No. Hei 11-92749, and the like); a polishing composition comprising water, α-alumina, and an alumina sol stabilized with acetic acid (Japanese Patent Laid-Open No. 2000-63805); a polishing composition for an aluminum magnetic disc, comprising water, an alumina abrasive powder, a polishing accelerator such as gluconic acid or lactic acid, and a surface-modifying agent such as a colloidal alumina (Japanese Patent Laid-Open No. Hei 2-84485); a polishing composition comprising water, an alumina abrasive, and a polishing accelerator comprising molybdic acid and an organic acid (Japanese Patent Laid-Open No. Hei 7-216345); and a polishing process.

However, none of these polishing compositions sufficiently satisfy all of an effect of reducing roll-off, an effect of increasing the polishing rate, an effect of reducing the surface roughness of a polished object, and an effect of reducing surface defects such as scratches and pits. Therefore, a polishing composition having further enhanced effects is in demand.

An object of the present invention is to provide a roll-off reducing agent capable of reducing roll-off of a polished substrate caused by polishing, and increasing a polishing rate; a roll-off reducing agent composition comprising the roll-off reducing agent; a process of reducing roll-off of a polished substrate by using the roll-off reducing agent; and a process for producing a polished substrate by using the roll-off reducing agent.

Also, another object of the present invention is to provide a polishing composition having an increased polishing rate, and a reduced surface roughness without causing a surface defect on the surface of the polished substrate, and being capable of reducing roll-off; a polishing process of a polished substrate by using the polishing composition; and a process for producing a polished substrate.

These and other objects of the present invention will be apparent from the following description.

In the present specification, the term "roll-off" refers to a state so-called edge rounding of an end surface, in which a part of an end surface of a substrate to be polished is more largely grinded as compared to that of the central part, thereby rounding off the end part.

SUMMARY OF THE INVENTION

According to the present invention, there are provided:

[1] a roll-off reducing agent comprising one or more compounds selected from the group consisting of carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof;

[2] a roll-off reducing agent composition comprising:

a roll-off reducing agent comprising one or more compounds selected from the group consisting of carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof;

an abrasive; and water;

[3] a polishing composition comprising:

water;

an abrasive;

a roll-off reducing agent comprising one or more compounds selected from the group consisting of carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof; and an intermediate alumina;

[4] a polishing composition comprising:

(A) one or more compounds selected from carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof;

(B) one or more compounds selected from polycarboxylic acids having 4 or more carbon atoms and having neither OH group or groups nor SH group or groups, aminopolycarboxylic acids, amino acids and salts thereof; and (C) one or more compounds selected from an intermediate alumina and an alumina sol;

an abrasive; and water;

[5] a polishing composition comprising:

(A) one or more compounds selected from carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof; and (B) one or more compounds selected from polycarboxylic acids having 4 or more carbon atoms and having neither OH group or groups nor SH group or groups, aminopolycarboxylic acids, amino acids and salts thereof;

an abrasive; and water;

[6] a process of reducing roll-off of a polished substrate, comprising applying to a substrate to be polished a roll-off reducing agent comprising one or more compounds selected from the group consisting of carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof;

[7] a process for producing a polished substrate, comprising a step of applying to a substrate to be polished a roll-off reducing agent comprising one or more compounds selected from the group consisting of carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof;

[8] a polishing process of a substrate to be polished comprising a step of polishing the substrate to be polished with the polishing composition of any one of items [3] to [5] above; and

[9] a process for producing a substrate comprising a step of polishing a substrate to be polished with the polishing composition of any one of items [3] to [5] above.

DETAILED DESCRIPTION OF THE INVENTION

1. Roll-Off Reducing Agent

Figure 1:
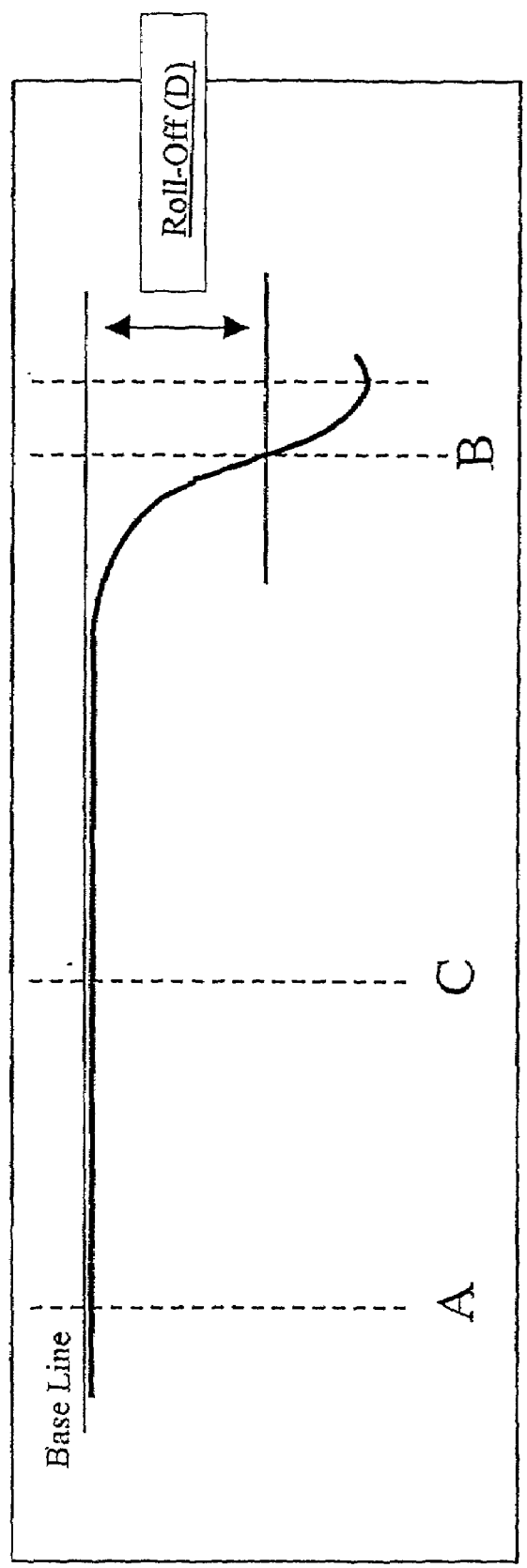
FIG. 1 is a graph showing a roll-off in connection with the detection curve.

The roll-off reducing agent used in the present invention is one or more compounds selected from the group consisting of carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof. Among them, the carboxylic acids having 2 to 20 carbon atoms having either OH group or groups or SH group or groups, the dicarboxylic acids having 2 to 3 carbon atoms, and salts thereof are preferable, from the viewpoint of an effect of improving roll-off.

The carboxylic acid having 2 to 20 carbon atoms having either OH group or groups or SH group or groups includes oxycarboxylic acids, and compounds in which an oxygen atom of the OH group of the oxycarboxylic acid is substituted by a sulfur atom. It is desired that the number of carbon atoms of these carboxylic acids is from 2 to 20, preferably from 2 to 12, more preferably from 2 to 8, still more preferably from 2 to 6, from the viewpoint of the solubility to water. In addition, as oxycarboxylic acids, those having a hydroxyl group at α-position of a carboxyl group are preferable, from the viewpoint of reducing roll-off.

It is desired that the number of carbon atoms of the monocarboxylic acid is from 1 to 20, preferably from 1 to 12, more preferably from 1 to 8, still more preferably from 1 to 6, from the viewpoint of the solubility to water.

The dicarboxylic acid is those having 2 to 3 carbon atoms, namely oxalic acid and malonic acid, from the viewpoint of reducing roll-off. Among these roll-off reducing agents, the oxycarboxylic acids are preferable, from the viewpoint of increasing the polishing rate. In addition, the dicarboxylic acids are preferable, from the viewpoint of reducing roll-off.

Concrete examples of the carboxylic acid having 2 to 20 carbon atoms having either OH group or groups or SH group or groups include glycolic acid, mercaptosuccinic acid, thioglycolic acid, lactic acid, β-hydroxypropionic acid, malic acid, tartaric acid, citric acid, isocitric acid, allocitric acid, gluconic acid, glyoxylic acid, glyceric acid, mandelic acid, tropic acid, benzilic acid, salicylic acid, and the like. Concrete examples of the monocarboxylic acid include formic acid, acetic acid, propionic acid, butyric acid, isobutyric acid, valeric acid, isovaleric acid, hexanoic acid, heptanoic acid, 2-methylhexanoic acid, octanoic acid, 2-ethylhexanoic acid, nonanoic acid, decanoic acid, lauric acid, and the like. Among them, acetic acid, oxalic acid, malonic acid, glycolic acid, lactic acid, malic acid, tartaric acid, glyoxylic acid, citric acid and gluconic acid are preferable; oxalic acid, malonic acid, glycolic acid, lactic acid, malic acid, tartaric acid, glyoxylic acid, citric acid and gluconic acid are more preferable; and oxalic acid, malonic acid, glycolic acid, tartaric acid and glyoxylic acid are especially preferable.

In addition, when oxalic acid, malic acid, tartaric acid, citric acid or gluconic acid is used alone or in combination with other roll-off reducing agent, it is preferable because clogging of the abrasive grains and polishing grounds in the polishing pad can be reduced, so that the deterioration of the polishing properties such as polishing rate and surface qualities by using the polishing pad for a long period of time can be prevented. Also, a frequent pad washing would not be necessary, namely the distance between the pad dressings can be remarkably extended, so that the productivity is increased, thereby making it preferable also from the viewpoint of economic advantages. Among them, oxalic acid, tartaric acid and citric acid are preferable, and especially citric acid is preferable. Each of the monocarboxylic acid and the dicarboxylic acid used in the present invention is selected from carboxylic acids having neither OH group or groups nor SH group or groups.

The salts of these acids (namely, carboxylic acids having 2 to 20 carbon atoms having either OH group or groups or SH group or groups, monocarboxylic acids having 1 to 20 carbon atoms, and dicarboxylic acids having 2 to 3 carbon atoms) are not particularly limited. Concretely, there are included salts with a metal, ammonium, an alkylammonium, an organic amine, and the like. Concrete examples of the metal include metals belonging to Group 1A, 1B, 2A, 2B, 3A, 3B, 4A, 6A, 7A or 8 of the Periodic Table (long period form). Among these metals, from the viewpoint of reducing roll-off, those metals belonging to Group 1A, 3A, 3B, 7A or 8 of the Periodic Table are preferable, and those metals belonging to Group 1A, 3A or 3B of the Periodic Table are more preferable. Sodium and potassium belonging to Group 1A are most preferable.

Concrete examples of the alkylammonium include tetramethylammonium, tetraethylammonium, tetrabutylammonium, and the like.

Concrete examples of the organic amine include dimethylamine, trimethylamine, alkanolamines, and the like.

Among these salts, ammonium salts, sodium salts and potassium salts are especially preferable.

2. Roll-Off Reducing Agent Composition

The roll-off reducing agent of the present invention can be used by formulating the agent in a polishing liquid comprising an abrasive and water. The polishing composition obtained above is especially referred to "roll-off reducing agent composition" in the present specification. Specifically, the roll-off reducing agent composition of the present invention comprises the above-mentioned roll-off reducing agent, an abrasive and water.

The content of the roll-off reducing agent in the roll-off reducing agent composition is preferably 0.01% by weight or more, from the viewpoints of reducing roll-off and increasing the polishing rate, and the content of the roll-off reducing agent is preferably 5% by weight or less, from the viewpoints of economic advantages and improving surface qualities. The content of the roll-off reducing agent is more preferably from 0.01 to 3% by weight, still more preferably from 0.01 to 2% by weight, most preferably from 0.02 to 1% by weight. Here, the roll-off reducing agent can be used alone or in admixture of two or more kinds.

As the abrasive used in the present invention, any abrasives generally employed for polishing can be used. The abrasive includes, for instance, metals; carbides of metals or metalloids, nitrides of metals or metalloids, oxides of metals or metalloids, borides of metals or metalloids, diamond, and the like. The metals or metalloids include those elements belonging to the Groups 2A, 2B, 3A, 3B, 4A, 4B, 5A, 6A, 7A or 8 of the Periodic Table (long period form). Concrete examples of the abrasive include α-alumina particles, silicon carbide particles, diamond particles, magnesium oxide particles, zinc oxide particles, cerium oxide particles, zirconium oxide particles, colloidal silica particles, fumed silica particles, and the like. It is preferable to use these abrasives in admixture of two or more kinds, from the viewpoint of increasing the polishing rate. Among them, α-alumina particles, cerium oxide particles, zirconium oxide particles, colloidal silica particles, fumed silica particles, and the like are more preferable, and α-alumina particles are especially preferable.

The average primary particle size of the abrasive is preferably from 0.01 to 3 μm, more preferably from 0.02 to 0.8 μm, especially preferably from 0.05 to 0.5 μm, from the viewpoint of increasing the polishing rate. Further, when the primary particles are aggregated to form a secondary particle, the average secondary particle size is preferably from 0.05 to 3 μm, more preferably from 0.1 to 1.5 μm, especially preferably from 0.2 to 1.2 μm, from the viewpoint of increasing the polishing rate in the same manner as above, and from the viewpoint of reducing the surface roughness of a polished object. The average primary particle size of the abrasive is obtained by subjecting the abrasive to an image analysis by observing with a scanning electron microscope (favorably from 3000 to 30000 times), and determining the particle size as a number-average particle size. In addition, the average secondary particle size can be determined as volume-average particle size by using a laser diffraction method.

The specific gravity of the abrasive is preferably from 2 to 6, more preferably from 2 to 5, from the viewpoints of the dispersibility, the feed ability to the polishing device and recovery and reuse.

The content of the abrasive is preferably from 1 to 40% by weight, more preferably from 2 to 30% by weight, still more preferably from 3 to 15% by weight, of the roll-off reducing agent composition, from the viewpoints of having economic advantages and making the surface roughness of a polished object small, thereby efficiently polishing the substrate.

Water in the roll-off reducing agent composition of the present invention is used as a medium, and the content of water is preferably from 50 to 98.99% by weight, more preferably 60 to 98% by weight, still more preferably from 70 to 95% by weight, from the viewpoint of efficiently polishing the object to be polished.

In addition, the roll-off reducing agent composition of the present invention can contain other components as occasion demands.

As other components, there are included organic acids and salts other than those listed as the roll-off reducing agent. The other components include, for instance, organic acids such as polycarboxylic acids, aminopolycarboxylic acids and amino acids, and salts thereof, inorganic acids and salts thereof, oxidizing agents, thickeners, dispersants, anticorrosive agents, basic substances, surfactants, and the like. Concrete examples of the organic acids and salts thereof, inorganic acids and salts thereof, and the oxidizing agents are those listed in Japanese Patent Laid-Open No. Sho 62-25187, page 2, upper right column, lines 3 to 11; Japanese Patent Laid-Open No. Sho 63-251163, page 2, lower left column, lines 7 to 14; Japanese Patent Laid-Open No. Hei 1-205973, page 3, upper left column, line 11 to upper right column, line 2; Japanese Patent Laid-Open No. Hei 3-115383, page 2, lower right column, line 16 to page 3, upper left column, line 11; Japanese Patent Laid-Open No. Hei 4-108887, page 2, lower left column, lines 1 to 9; Japanese Patent Laid-Open No. Hei 4-275387, page 2, right column, line 27 to page 3, left column, line 12; Japanese Patent Laid-Open No. Hei 4-363385, page 2, right column, lines 21 to 30, the entire contents of which are incorporated herein by reference, and the like.

These other components may be used alone or in admixture of two or more kinds. In addition, the content of the other components is preferably from 0.05 to 20% by weight, more preferably from 0.05 to 10% by weight, still more preferably from 0.05 to 5% by weight, of the roll-off reducing agent composition, from the viewpoint of exhibiting the respective functions and from the viewpoint of economic advantages.

The concentration of each component of the above-mentioned roll-off reducing agent composition is a preferable concentration during polishing, and it may be a concentration during the preparation of the composition. The composition is usually prepared as a concentrate, and the concentrate is diluted upon use in many cases.

The roll-off reducing agent composition of the present invention can be prepared by adding one or more compounds selected from the group consisting of the carboxylic acids having 2 to 20 carbon atoms having either OH group or groups or SH group or groups, the monocarboxylic acids having 1 to 20 carbon atoms, and the dicarboxylic acids having 2 to 3 carbon atoms, and salts thereof, and various additives, as occasion demands in proper amounts to water and an abrasive, and mixing the components by a known process.

It is preferable that the pH of the roll-off reducing agent composition is appropriately adjusted depending upon the kinds and the required qualities and the like of the substrate to be polished. For instance, the pH of the roll-off reducing agent composition is preferably from 2 to 12, from the viewpoints of the cleanability of the substrate and the anti-corrosiveness of the working machine, and from the viewpoint of the safety of the operator. In addition, in a case where a substrate to be polished is a substrate for precision parts which is mainly made of a metal such as an Ni—P plated aluminum alloy substrate, the pH is preferably from 2 to 9, especially preferably from 3 to 8, from the viewpoints of increasing the polishing rate and improving the surface qualities. When the roll-off reducing agent composition is used for polishing a semiconductor wafer, a semiconductor element, or the like, especially for polishing a silicon substrate, a poly-silicon film, an $SiO_2$ film, or the like, the pH is preferably from 7 to 12, more preferably from 8 to 12, especially preferably from 9 to 11, from the viewpoints of increasing the polishing rate and improving the surface qualities. The pH can be adjusted by adding properly an inorganic acid such as nitric acid or sulfuric acid, an organic acid such as a polycarboxylic acid, an aminopolycarboxylic acid, or an amino acid, a metal salt or an ammonium salt thereof, or a basic substance such as aqueous ammonia, sodium hydroxide, potassium hydroxide or amine in a desired amount as occasion demands.

3. Process of Reducing Roll-Off of Polished Substrate by Using Roll-Off Reducing Agent and Process for Producing Polished Substrate The material for an object to be polished as representatively exemplified by the substrate to be polished used in the present invention includes, for instance, metals or metalloids such as silicon, aluminum, nickel, tungsten, copper, tantalum and titanium; alloys made of these metals as main components; glassy substances such as glass, glassy carbon and amorphous carbons; ceramic materials such as alumina, silicon dioxide, silicon nitride, tantalum nitride and titanium nitride; resins such as polyimide resins; and the like. Among them, it is preferable that an object to be polished is made of a metal such as aluminum, nickel, tungsten or copper, or made of an alloy containing these metals as the main components; or an object to be polished is a semiconductor substrate made of semiconductor elements containing these metals. Especially, in a case where the roll-off reducing agent of the present invention is used when polishing an aluminum alloy substrate plated with Ni—P, it is preferable because the extent of roll-off can be made small.

The shape for the object to be polished is not particularly limited. For instance, those having shapes containing planar portions such as discs, plates, slabs and prisms, or shapes containing curved portions such as lenses can be subjects for polishing with the roll-off reducing agent composition of the present invention. Among them, those having the disc-shaped objects are especially preferable in polishing.

The roll-off reducing agent of the present invention can be favorably used in polishing the substrate for precision parts. For instance, the roll-off reducing agent is suitable for polishing substrates for precision parts such as substrates for magnetic recording media for magnetic discs, optical discs, opto-magnetic discs, and the like; photomask substrates, optical lenses, optical mirrors, optical prisms and semiconductor substrates. The polishing of a semiconductor substrate comprises the steps of polishing a silicon wafer (bare wafer), forming separation membrane for an embedding element, flattening an interlayer insulating film, forming an embedded metal line, and forming embedded capacitor, and the like. The roll-off reducing agent composition of the present invention is especially suitable for polishing a magnetic disc substrate.

In the process of reducing roll-off of the polished substrate using the roll-off reducing agent of the present invention, the extent of roll-off of the polished substrate can be remarkably reduced by polishing the substrate to be polished listed above with a polishing liquid comprising the roll-off reducing agent of the present invention, or the roll-off reducing agent composition of the present invention per se as a polishing liquid.

For instance, a substrate with reduced roll-off can be produced by clamping a substrate with polishing discs to which a polishing cloth made of nonwoven organic polymer fabric, is pasted; feeding a polishing liquid comprising the roll-off reducing agent of the present invention, or the roll-off reducing agent composition of the present invention to a polishing surface; and moving the polishing discs or the substrate, with applying a given pressure.

The roll-off generated in the polished substrate in the present invention can be evaluated by determining the shape of the end surface part by using, for instance, a tracer or optical profilometer, and numerically expressing the extent of how much more the end surface is grounded as compared to the central portion of the disc in accordance with the profile.

The method of numerically expressing roll-off is determined as follows. As shown in FIG. 1, three points, i.e. point A, point B and point C, are taken on the detection curve which are given distances away from the center of the disc, the detection curve meaning the shape of the end surface part of the polished substrate). Roll-off refers to a distance (D) between point B and a base line, wherein the base line is defined as a straight line connecting point A and point C. The term "having good roll-off" refers to a value of D more approximating 0. The roll-off value refers to a value obtained by dividing D by ½ of the amount of variation in the thickness of the disc before and after polishing. The roll-off value is preferably 0.2 μm/μm or less, more preferably 0.15 μm/μm or less, still more preferably 0.10 μm/μm or less.

Here, the positions of point A, point B and point C may vary depending upon the size of the object to be determined. In general, it is preferable that point B is positioned at 0.5 mm away from the end of the disc on the line connecting the end part and the center of the disc, that the point C is positioned at 2.5 mm away from the end, and that that the point A is positioned at 4.5 mm away from the end. For instance, in the case of 3.5 inch disc, it is preferable that point A, point B and point C are respectively positioned at 43 mm, 47 mm and 45 mm away from the center of the disc.

In addition, in the polishing process of a substrate for precision parts or the like, by using the roll-off reducing agent of the present invention, there are advantages that not only the roll-off of the substrate can be remarkably reduced, but also that the polishing rate can be increased. Also, in a case where one or more kinds selected from oxalic acid, malic acid, tartaric acid, citric acid, gluconic acid, and salts thereof are used as the roll-off reducing agent, it is preferable because the clogging of the abrasive grains and polishing grounds in the polishing pad can be reduced, so that the deterioration of the polishing properties such as polishing rate and surface qualities by using the polishing pad for a long period of time can be prevented.

In this case, among the above-mentioned compounds, oxalic acid, tartaric acid, citric acid and salts thereof are preferable, and especially citric acid and salts thereof are preferable. In addition, in a case where the above-mentioned compounds are used in combination of two or more kinds, especially preferable combinations are combinations of two or more kinds selected from oxalic acid, tartaric acid, citric acid and salts thereof, or combinations of one or more kinds selected from oxalic acid, tartaric acid, citric acid and salts thereof, with one or more kinds selected from malonic acid, glycolic acid, lactic acid, malic acid, gluconic acid and salts thereof. More preferable are combinations of citric acid or a salt thereof with one or more kinds selected from oxalic acid, glycolic acid, lactic acid, malic acid, tartaric acid and salts thereof. Particularly preferable combinations are citric acid or a salt thereof with glycolic acid or a salt thereof.

The roll-off reducing agent composition of the present invention especially has an effect in the polishing process, and the roll-off reducing agent composition can be similarly applied to a process other than the polishing process, for instance, a lapping process, and the like.

4. Polishing Composition

The polishing composition of the present invention can be roughly classified into the following three embodiments:

Embodiment 1

A polishing composition comprising:
water;
an abrasive;
a roll-off reducing agent comprising one or more compounds selected from the group consisting of carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof; and
an intermediate alumina.

Embodiment 2

A polishing composition comprising:
(A) one or more compounds selected from carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof;
(B) one or more compounds selected from polycarboxylic acids having 4 or more carbon atoms and having neither OH group or groups nor SH group or groups, aminopolycarboxylic acids, amino acids and salts thereof; and
(C) one or more compounds selected from an intermediate alumina and an alumina sol;
an abrasive; and
water.

Embodiment 3

A polishing composition comprising:
(A) one or more compounds selected from carboxylic acids having 2 to 20 carbon atoms having either OH group or groups or SH group or groups, monocarboxylic acids having 1 to 20 carbon atoms, and dicarboxylic acids having 2 to 3 carbon atoms, and salts thereof; and
(B) one or more compounds selected from polycarboxylic acids having 4 or more carbon atoms and having neither OH group or groups nor SH group or groups, aminopolycarboxylic acids, amino acids and salts thereof;
an abrasive; and
water.

Embodiment 1

The polishing composition of Embodiment 1, as described above, comprises water, an abrasive, a roll-off reducing agent, and an intermediate alumina.

As the abrasive usable in Embodiment 1, those abrasives which are generally used for polishing can be used. Examples of the abrasives are not particularly limited, as long as they are the same ones as those used in the above-mentioned roll-off reducing agent composition.

The content of the abrasive is preferably from 1 to 40% by weight, more preferably from 2 to 30% by weight, still more preferably from 3 to 15% by weight, of the polishing composition of Embodiment 1, from the viewpoints of having economic advantages and making the surface roughness of a polished object small, thereby making it possible to efficiently polish the substrate.

The roll-off reducing agent usable in Embodiment 1 may be the same ones as those mentioned above.

The content of the roll-off reducing agent is preferably from 0.01 to 5% by weight, more preferably from 0.015 to 4% by weight, still more preferably from 0.03 to 2% by weight, of the polishing composition of Embodiment 1, from the viewpoints of reducing roll-off and having economic advantages.

In addition, the intermediate alumina used in Embodiment 1 is a generic term referring to alumina particles other than α-alumina particles. Concrete examples thereof include γ-alumina particles, δ-alumina particles, θ-alumina particles, η-alumina particles, κ-alumina particles, and mixtures thereof. Among them, the following intermediate aluminas are preferable, from the viewpoints of increase in the polishing rate and the effect of reducing the surface roughness of a polished object. The crystal forms of the intermediate alumina preferably include γ-alumina, δ-alumina, θ-alumina, and mixtures thereof, more preferably γ-alumina and θ-alumina. In addition, the intermediate alumina has a specific surface area (BET method) of preferably from 30 to 300 $m^2/g$, more preferably from 50 to 200 $m^2/g$, and an average particle size of preferably from 0.01 to 5 μm, more preferably from 0.05 to 5 μm, still more preferably from 0.1 to 3 μm, especially preferably from 0.1 to 1.5 μm. The average particle size can be determined as a volume-average particle size by using a laser diffraction method (for instance, one commercially available form Horiba, LTD. under the trade name of LA-920). In addition, the content of each of the alkali metal and the alkaline earth metal in the intermediate alumina particles is preferably 0.1% by weight or less, more preferably 0.05% by weight or less, especially preferably 0.01% by weight or less.

For instance, in a case where aluminum hydroxide, an alumina sol or the like which has a relatively large specific surface area and a low content of the alkali metal and the alkaline earth metal is used as a raw material, since there is little fusion of the intermediate alumina produced and the particle strength is small, no surface defects are caused on a polished substrate, thereby making it especially effective in reducing the surface roughness of a polished object.

As the raw material which can be used in the preparation of the intermediate alumina, there can be used, for instance, aluminum hydroxide, alumina sols, and the like, which can be represented by the formulas $Al(OH)_3$, $Al_2O_3 \cdot 3H_2O$, $AlOOH$, $Al_2O_3 \cdot H_2O$, and $Al_2O_3 \cdot nH_2O$, wherein n is a number of 1 to 3. The specific surface area of the raw material is preferably 10 $m^2/g$ or more, more preferably 30 $m^2/g$ or more, especially preferably 50 $m^2/g$ or more. In addition, the content of each of the alkali metal and the alkaline earth metal in the raw material is preferably 0.1% by weight or less, more preferably 0.05% by weight or less, especially preferably 0.03% by weight or less. Further, in a case where an intermediate alumina is prepared by thermally dehydrating aluminum hydroxide, a forcible introduction of a dry air or nitrogen gas during baking is further effective in the reduction of surface defects and surface roughness of the polished substrate. Here, the above-mentioned thermal dehydration treatment can be carried out by a conventional method.

These intermediate aluminas are adjusted to a given particle size by wet pulverization or dry pulverization by using a pulverizer such as a ball-mill, a beads-mill, a high-pressure homogenizer or a jet mill as occasion demands.

Since the intermediate alumina is used together with the abrasive and the roll-off reducing agent mentioned above, the polishing rate is increased and surface defects such as pits are prevented, and the reduction in the surface roughness of the polished substrate can be further accelerated.

It is desired that the content of the intermediate alumina in the polishing composition of Embodiment 1 is from 1 to 100 parts by weight, preferably from 2 to 70 parts by weight, more preferably from 4 to 40 parts by weight, based on 100 parts by weight of the abrasive, from the viewpoints of economic advantages, an accelerated effect of polishing, and an effect of reducing the surface roughness of the polished substrate, and from the viewpoint of obtaining capability of preventing surface defects such as pits.

Water in the polishing composition of Embodiment 1 is used as a medium, and the content of water is preferably from 40 to 98% by weight, more preferably from 50 to 97% by weight, especially preferably from 60 to 95% by weight, from the viewpoint of being capable of efficiently polishing the object to be polished.

Embodiment 2

The polishing composition of Embodiment 2, as described above, comprises one or more compounds selected from Compounds (A), one or more compounds selected from Compounds (B), one or more compounds selected from Compounds (C), an abrasive, and water.

Compounds (A) usable in Embodiment 2 are the same as the roll-off reducing agent usable in Embodiment 1 mentioned above.

The content of Compounds (A) is preferably from 0.01 to 5% by weight, more preferably from 0.015 to 3% by weight, still more preferably from 0.03 to 2% by weight, of the polishing composition of Embodiment 2, from the viewpoint of improving roll-off and from the viewpoint of having economic advantages.

Compounds (B) usable in Embodiment 2 have an action of increasing the polishing rate. Compounds (B) include polycarboxylic acids having 4 or more carbon atoms and having neither OH group or groups nor SH group or groups, aminopolycarboxylic acids, amino acids and salts thereof.

Among the polycarboxylic acids having 4 or more carbon atoms and having neither OH group nor groups or SH group or groups, those having 4 to 20 carbon atoms are preferable, more preferably 4 to 10 carbon atoms, from the viewpoint of increasing the polishing rate. Also, for the same viewpoint as above, the aminopolycarboxylic acids preferably have a number of amino groups in one molecule of from 1 to 6, more preferably from 1 to 4, a number of carboxyl groups in one molecule of preferably from 1 to 12, more preferably 2 to 8, and a number of carbon atoms of preferably from 1 to 30, preferably from 1 to 20. For the same viewpoint as above, the amino acids preferably have a number of carbon atoms of preferably from 2 to 20, preferably from 2 to 10. Among them, polycarboxylic acids having 4 or more carbon atoms and having neither OH group or groups nor SH group or groups, aminopolycarboxylic acids, and salts thereof are preferable, from the viewpoint of increasing the polishing rate.

Concrete examples thereof include succinic acid, maleic acid, fumaric acid, glutaric acid, citraconic acid, itaconic acid, tricarballylic acid, adipic acid, propane-1,1,2,3-tetracarboxylic acid, butane-1,2,3,4-tetracarboxylic acid, diglycolic acid, nitrilotriacetic acid, ethylenediaminetetraacetic acid (EDTA), diethylenetriaminepentaacetic acid (DTPA), hydroxyethylethylenediaminetetraacetic acid (HEDTA), triethylenetetraminehexaacetic acid (TTHA), dicarboxymethylglutamic acid (GLDA), glycine, alanine, and the like.

Among them, succinic acid, maleic acid, fumaric acid, glutaric acid, citraconic acid, itaconic acid, tricarballylic acid, adipic acid, diglycolic acid, nitrilotriacetic acid, ethylenediaminetetraacetic acid and diethylenetriaminepentaacetic acid are preferable, and succinic acid, maleic acid, fumaric acid, citraconic acid, itaconic acid, tricarballylic acid, diglycolic acid, ethylenediaminetetraacetic acid and diethylenetriaminepentaacetic acid are more preferable.

In addition, the salts of these acids, i.e. salts of polycarboxylic acids having 4 or more carbon atoms and having neither OH group or groups nor SH group or groups, salts of aminopolycarboxylic acids and salts of amino acids, are not particularly limited. Concretely, there are included salts with a metal, ammonium, an alkylammonium, an organic amine, and the like. Concrete examples of the metal include metals belonging to Group 1A, 1B, 2A, 2B, 3A, 3B, 4A, 6A, 7A or 8 of the Periodic Table (long period form). Among these metals, from the viewpoint of increasing the polishing rate, the metals belonging to Group 1A, 3A, 3B, 7A or 8 of the Periodic Table are preferable, and the metals belonging to Group 1A, 3A, 3B or 8 of the Periodic Table are more preferable. Sodium and potassium belonging to Group 1A, cerium belonging to Group 3A, aluminum belonging to Group 3B and iron belonging to Group 8 are most preferable.

Concrete examples of the alkylammonium include tetramethylammonium, tetraethylammonium, tetrabutylammonium, and the like.

Concrete examples of the organic amine include dimethylamine, trimethylamine, alkanolamines, and the like.

Among these salts, ammonium salts, sodium salts, potassium salts and aluminum salts are especially preferable.

These compounds of Compounds (B) can be used alone or in admixture of two or more kinds.

A total content of Compounds (B) is preferably from 0.01 to 10% by weight, more preferably from 0.02 to 7% by weight, still more preferably from 0.03 to 5% by weight, of the polishing composition of Embodiment 2, from the viewpoint of the effect of accelerating polishing, the viewpoint of economic advantages, and the viewpoint of improvement in the surface qualities.

Also, in Embodiment 2, more preferable combinations of Compounds (A) with Compounds (B) are combinations of one or more compounds selected from Compounds (A), acetic acid, oxalic acid, malonic acid, glycolic acid, lactic acid, malic acid, glyoxylic acid, tartaric acid, citric acid, gluconic acid, and salts thereof, with one or more compounds selected from Compounds (B), succinic acid, maleic acid, fumaric acid, glutaric acid, citraconic acid, itaconic acid, adipic acid, tricarballylic acid, diglycolic acid, nitrilotriacetic acid, ethylenediaminetetraacetic acid, diethylenetriaminepentaacetic acid and salts thereof, from the viewpoints of increasing the polishing rate and reducing roll-off. Still more preferable are combinations of one or more compounds selected from Compounds (A), oxalic acid, malonic acid, glycolic acid, lactic acid, malic acid, glyoxylic acid, tartaric acid, citric acid, gluconic acid, and salts thereof, with one or more compounds selected from Compounds (B), succinic acid, maleic acid, fumaric acid, citraconic acid, itaconic acid, tricarballylic acid, diglycolic acid, ethylenediaminetetraacetic acid, diethylenetriaminepentaacetic acid and salts thereof. Especially preferable are combinations of one or more compounds selected from Compounds (A), glycolic acid, oxalic acid, tartaric acid, citric acid, malonic acid, and salts thereof, with one or more compounds selected from Compounds (B), succinic acid, maleic acid, itaconic acid, fumaric acid, ethylenediaminetetraacetic acid, diethylenetriaminepentaacetic acid and salts thereof. In addition, in a case where one or more compounds selected from oxalic acid, malic acid, tartaric acid, citric acid, gluconic acid and salts thereof are used as Compounds (A), it is preferable, because clogging of the abrasive grains and polishing grounds in the polishing pad can be reduced, so that the deterioration of the polishing properties such as polishing rate and surface qualities by using the polishing pad for a long period of time can be prevented.

In this case, among Compounds (A), oxalic acid, tartaric acid, citric acid, and salts thereof are preferable, and citric acid and salts thereof are especially preferable. In addition, in a case where two or more kinds of Compounds (A) are used in combination, especially preferable combinations are combinations of two or more kinds selected from oxalic acid, tartaric acid, citric acid and salts thereof; or combinations of one or more kinds selected from oxalic acid, tartaric acid, citric acid and salts thereof with one or more kinds selected from malonic acid, glycolic acid, lactic acid, malic acid, gluconic acid and salts thereof. More preferable combinations are combinations of citric acid or a salt thereof with one or more kinds selected from oxalic acid, glycolic acid, lactic acid, malic acid, tartaric acid and salts thereof. Especially preferable combinations are combinations of citric acid or a salt thereof with glycolic acid or a salt thereof.

Compounds (C) used in Embodiment 2 comprise an intermediate alumina and alumina sol. The intermediate alumina is a generic term referring to alumina particles other than α-alumina particles. The intermediate alumina may be the same ones as those usable in Embodiment 1 mentioned above.

In addition, the alumina sol refers to those which can be represented by the formulas AlOOH, AlOOH.nH$_2$O, wherein n is a number of 1 to 3, for instance, Al$_2$O$_3$.H$_2$O and the like. The crystal forms of the alumina sol include boehmite, pseudo-boehmite and amorphous. The alumina sol can be prepared by subjecting aluminum hydroxide, for instance, gibbsite, to a hydrothermal treatment at 250° C. or so, or hydrolyzing an aluminum alcoholate. The alumina sol has an average particle size of preferably from 0.01 to 5 μm, more preferably from 0.05 to 5 μm, still more preferably from 0.1 to 3 μm, especially preferably from 0.1 to 1.5 μm. The average particle size can be determined as a volume-average particle size by using a laser diffraction method. The alumina sol has a specific surface area (BET method) of preferably from 30 to 300 m$^2$/g, more preferably from 50 to 200 m$^2$/g.

Since the intermediate alumina and the alumina sol in Compounds (C) are used together with Compounds (A) and Compounds (B), the effects that the polishing rate is increased and surface defects such as pits are prevented, and the reduction in the surface roughness of the polished object can be further accelerated. In this case, the intermediate alumina and the alumina sol in Compounds (C) can be used alone or in admixture. Especially, the intermediate alumina is more preferable, from the viewpoints of an increase in the polishing rate, an extent of the effect of preventing surface defects and the like, and an effect of reducing the surface roughness of a polished object.

A total content of Compounds (C) in the polishing composition of Embodiment 2 is preferably from 1 to 100 parts by weight, more preferably from 2 to 70 parts by weight, still more preferably from 4 to 40 parts by weight, based on 100 parts by weight of the abrasive, from the viewpoints of economic advantages, the effect of accelerating polishing, the effect of reducing the surface roughness of a polished object, and from the viewpoint of obtaining the capability of preventing surface defects such as pits.

As the abrasive usable in Embodiment 2, those abrasives which are generally used for polishing can be used. The abrasives may be the same ones as those used in the above-mentioned roll-off reducing agent composition.

The content of the abrasive is preferably from 1 to 40% by weight, more preferably from 2 to 30% by weight, still more preferably from 3 to 15% by weight, of the polishing composition of Embodiment 2, from the viewpoints of having economic advantages and making the surface roughness of a polished object small, thereby making it possible to efficiently polish the object to be polished.

Water in the polishing composition of Embodiment 2 is used as a medium, and the content of water is preferably from 40 to 98% by weight, more preferably 50 to 97% by weight, especially preferably from 60 to 95% by weight, from the viewpoint of being capable of efficiently polishing the object to be polished.

Embodiment 3

The polishing composition of Embodiment 3, as described above, comprises one or more compounds selected from Compounds (A), one or more compounds selected from Compounds (B), an abrasive, and water.

Compounds (A) usable in Embodiment 3 have an action of improving roll-off caused in the polished substrate, and are the same ones as those exemplified as Compounds (A) in Embodiment 2 mentioned above can be used.

The content of Compounds (A) is preferably from 0.01 to 5% by weight, more preferably from 0.015 to 3% by weight, still more preferably from 0.03 to 2% by weight, of the polishing composition of Embodiment 3, from the viewpoints of improving roll-off and having economic advantages.

Compounds (B) usable in Embodiment 3 have an action of increasing the polishing rate, and the same ones as those Compounds (B) which are used in Embodiment 2 mentioned above can be used.

The content of Compounds (B) is preferably from 0.01 to 10% by weight, more preferably from 0.02 to 7% by weight, still more preferably from 0.03 to 5% by weight, of the polishing composition of Embodiment 3, from the viewpoint of the effect of accelerating polishing, the viewpoint of economic advantages, and the viewpoint of improvement in the surface qualities.

As to the combinations of Compounds (A) and Compounds (B), the same ones as those combinations which are mentioned in Embodiment 2 can be used.

As the abrasive usable in Embodiment 3, those abrasives which are generally used for polishing can be used. Examples of the abrasives may be the same ones as those used in the above-mentioned roll-off reducing agent composition.

The content of the abrasive is preferably from 1 to 40% by weight, more preferably from 2 to 30% by weight, still more preferably from 3 to 15% by weight, of the polishing composition of Embodiment 3, from the viewpoints of having economic advantages and making the surface roughness of a polished object small, thereby making it possible to efficiently polish the substrate.

Water in the polishing composition of Embodiment 3 is used as a medium, and the content of water is preferably from 40 to 98% by weight, more preferably from 50 to 97% by weight, especially preferably from 60 to 95% by weight, from the viewpoint of being capable of efficiently polishing the object to be polished.

The polishing composition of the present invention, as representatively exemplified by Embodiments 1 to 3 described above, can contain other components as occasion demands. As other components, there are included organic acids and salts other than the above-mentioned roll-off reducing agent. The other components include, for instance, organic acids such as polycarboxylic acids, aminopolycarboxylic acids and amino acids, and salts thereof, inorganic acids and salts thereof, oxidizing agents, thickeners, dispersants, anticorrosive agents, basic substances, surfactants, and the like. Concrete examples of the organic acids and salts thereof, inorganic acids and salts thereof, and the oxidizing agents may be the same ones used in the above-mentioned roll-off reducing agent composition.

These other components may be used alone or in admixture of two or more kinds. In addition, the content of the other components is preferably from 0.05 to 20% by weight, more preferably from 0.05 to 10% by weight, still more preferably from 0.05 to 5% by weight, of the polishing composition, from the viewpoint of increasing the polishing rate, from the viewpoint of exhibiting the respective functions and from the viewpoint of economic advantages.

The concentration of each component of the above-mentioned polishing composition is a preferable concentration during polishing, and it may be a concentration during the preparation of the composition. The composition is usually prepared as a concentrate, and the concentrate is diluted upon use in many cases.

The process for preparing the polishing composition of the present invention includes the following:

The polishing composition of Embodiment 1 can be prepared by adding together in proper amounts an abrasive, a roll-off reducing agent, an intermediate alumina, and water, and various additives, as occasion demands, each of which is exemplified above, and mixing the components by a known process.

Also, the polishing composition of Embodiment 2 can be prepared by adding together in proper amounts Compounds (A), Compounds (B), Compounds (C), an abrasive, water, and various additives as occasion demands, each of which is exemplified above, and mixing the components by a known process.

In addition, the polishing composition of Embodiment 3 can be prepared by adding together in proper amounts Compounds (A), Compounds (B), an abrasive, water, and various additives as occasion demands, each of which is exemplified above, and mixing the components by a known process.

It is preferable that the pH of the polishing composition of the present invention is appropriately adjusted depending upon the kinds and the required qualities and the like of the object to be polished. For instance, the pH of the polishing composition is preferably from 2 to 12, from the viewpoints of the cleanability of the substrate and anti-corrosiveness of the working machine, and from the viewpoint of the safety of the operator. In addition, in a case where an object to be polished is a substrate for precision parts which is mainly made of a metal such as an Ni—P plated aluminum alloy substrate, the pH is more preferably from 2 to 9, especially preferably from 3 to 8, from the viewpoints of increasing the polishing rate and improving the surface qualities. When the polishing composition is used for polishing a semiconductor wafer, a semiconductor element, or the like, especially polishing a silicon substrate, a poly-silicon film, an $SiO_2$ film, or the like, the pH is preferably from 7 to 12, more preferably from 8 to 12, especially preferably from 9 to 11, from the viewpoints of increasing the polishing rate and improving the surface qualities. The pH can be adjusted by adding properly an inorganic acid such as nitric acid or sulfuric acid, an organic acid, or a basic substance such as aqueous ammonia, sodium hydroxide, potassium hydroxide in a desired amount as occasion demands.

5. Polishing Process of Substrate to Be Polished by Using Polishing Composition

The polishing process of a substrate to be polished of the present invention comprises polishing a substrate to be polished by using the polishing composition of the present invention, or preparing a polishing liquid by mixing each component so as to give the composition of the polishing composition of the present invention. Especially, the substrate for precision parts can be suitably produced.

The material for the object to be polished as representatively exemplified by the substrate to be polished used in the present invention may be the same ones as those to which the above-mentioned roll-off reducing agent composition is used. Especially, in a case where the polishing composition of the present invention is used when polishing an aluminum alloy substrate plated with Ni—P, it is preferable because the roll-off can be reduced, the polishing rate can be increased, and the surface roughness of a polished object can be reduced without causing surface defects.

The shape for the object to be polished is not particularly limited, and may be the same ones as those for the above-mentioned roll-off reducing agent composition.

The polishing composition of the present invention can be favorably used in polishing the substrate for precision parts. For instance, the polishing composition is suitable for polishing substrates for magnetic recording media for magnetic discs, optical discs, opto-magnetic discs, and the like; photomask substrates, optical lenses, optical mirrors, optical prisms and semiconductor substrates. The polishing of the semiconductor substrates comprises the steps of polishing a silicon wafer (bare wafer), forming separation membrane for an embedding element, flattening an interlayer insulating film, forming an embedded metal line, and forming embedded capacitor, and the like. The polishing composition of the present invention is especially suitable for polishing a magnetic disc substrate. Among the magnetic disc substrates, aluminum magnetic disc substrates plated with Ni—P can be especially suitably used.

6. Process for Producing Polished Substrate by Using Polishing Composition

In addition, a process for producing a polished substrate by using the polishing composition of the present invention includes, for instance, a process comprising clamping a substrate to be polished with polishing discs to which a polishing cloth made of nonwoven organic polymer fabric, is pasted; feeding a polishing composition of the present invention to a polishing surface; and moving the polishing discs or the substrate, with applying a given pressure, thereby reducing roll-off and surface roughness of the polished object, to give a substrate without surface defects. Here, the roll-off generated in the polished substrate in the present invention can be evaluated in the same manner as described above.

As described above, by using the polishing composition of the present invention, a high-quality substrate with reduced surface roughness and reduced roll-off as well as increased polishing rate can be produced with high production efficiency without generating surface defects on the polished substrate. In addition, when a polishing composition comprising one or more compounds selected from oxalic acid, malic acid, tartaric acid, citric acid, gluconic acid and salts thereof is used, it is preferable because clogging of the abrasive grains and polishing grounds in the polishing pad can be reduced, so that the deterioration of the polishing properties such as polishing rate and surface qualities by using the polishing pad for a long period of time can be prevented.

In this case, among the above-mentioned compounds, oxalic acid, tartaric acid, citric acid and salts thereof are preferable, and especially citric acid and salts thereof are preferable. When these compounds are used in combination of two or more kinds, especially preferable combinations are combinations of two or more kinds selected from oxalic acid, tartaric acid, citric acid and salts thereof; or combinations of one or more kinds selected from oxalic acid, tartaric acid, citric acid and salts thereof with one or more kinds selected from malonic acid, glycolic acid, lactic acid, malic acid, gluconic acid and salts thereof. More preferable are combinations of citric acid or a salt thereof with one or more kinds selected from oxalic acid, glycolic acid, lactic acid, malic acid, tartaric acid and salts thereof. Especially preferable combinations are combinations of citric acid or a salt thereof with glycolic acid or a salt thereof.

The polishing composition of the present invention especially has an effect in the polishing process, and the polishing composition can be similarly applied to a process other than the polishing process, for instance, a lapping process, and the like.

EXAMPLES

Examples I-1 to I-10 and Comparative Examples I-1 to I-5

There were mixed together 7 parts by weight of an abrasive [α-alumina (purity: about 99.9%) having primary average particle size: 0.23 μm, and secondary average particle size: 0.5 μm], a given amount of a roll-off reducing agent used in Examples or a compound used in Comparative Examples as listed in Table 1, and balance ion-exchanged water, with stirring. Here, the pH of each composition in Examples I-1 to I-10 and Comparative Examples I-2 to I-4 was adjusted to 4 with an aqueous ammonia, and the pH of each composition in Comparative Examples I-1 and I-5 was adjusted to 4 with nitric acid, to give 100 parts by weight of each roll-off reducing agent composition of Examples I-1 to I-10 and Comparative Examples I-1 to I-5.

Using each of the resulting roll-off reducing agent compositions, a substrate surface made of an Ni—P plated aluminum alloy, the substrate surface having an average deviation, of all points from plane fit to test part surface Ra of 0.2 μm, as determined by Talystep commercially available from Rank Taylor-Hobson Limited (size of tip end of profilometer: 25 μm×25 μm, by-pass filter: 80 μm, measurement length: 0.64 mm), a thickness of 0.8 mm and a diameter of 95 mm was polished with a double-sided processing machine under Set Conditions I for Double-Sided Processing Machine given below, to give a polished Ni—P plated, aluminum alloy substrate usable for magnetic recording media.

Set Conditions I for Double-Sided Processing Machine are as follows.

Set Conditions I for Double-Sided Processing Machine
Double-sided processing machine: double-sided processing machine, Model 9B, manufactured by SPEEDFAM CO., LTD.
Processing pressure: 9.8 kPa
Polishing Pad: "POLYTEX DG-H" (manufactured by Rodel Nitta K.K.).
Disc rotational speed: 50 r/min
Feeding flow rate for a polishing composition: 100 ml/min
Polishing time period: 5 minutes
Number of substrate introduced: 10

After polishing, the value of roll-off generated in the polished substrate was determined by the method described below, and expressed as a relative value on the basis of the value of Comparative Example I-2. Also, the thickness of an Ni—P plated aluminum alloy substrate of Examples was determined by using a thickness tester (a laser thickness tester, commercially available from Mitsutoyo Corporation, Model LGH-110/LHC-11N). A rate of decrease in the thickness was obtained from the changes in the thickness of the aluminum alloy substrate before and after polishing, and expressed as a relative value (relative polishing rate) on the basis of the polishing rate of Comparative Example I-1.

The results are shown in Table 1.

Method for Determination of Roll-Off
Determination device: Mitsutoyo form tracer SV-C624
Tip end radius of profilometer: 2 μm (Code No. 178-381)
Pressure at profilometer: 0.7 mN or less
Speed: 0.2 mm/s
Analyzing software: SV-600 Fine Profile Analysis System, Version 1.01
Filter: LPF (Gaussian) 0.800 mm Using the device as specified above, the shape of the end part of the disc at 42.5 mm to 47.5 mm away from the center of the disc was determined, and D was obtained by using an analyzing software in accordance with the above determination method by taking points A, B and C at 43 mm away from the center of the disc, at 47 mm away from the center, and at 45 mm away from the center, respectively. The value obtained by dividing D by ½ the amount of change of thickness of the disc before and after polishing is defined as the roll-off value.

TABLE 1

| Added Compound | Amount (Parts by Weight) | Roll-Off (Relative Value) | Polishing Rate (Relative Value) |
|---|---|---|---|
| Ex. No. | | | |
| I-1 Lactic Acid | 0.81 | 0.54 | 1.6 |
| I-2 Glycolic Acid | 0.69 | 0.23 | 1.4 |
| I-3 Tartaric Acid | 0.68 | 0.24 | 1.3 |
| I-4 Citric Acid | 0.58 | 0.41 | 1.5 |
| I-5 Malic Acid | 0.61 | 0.43 | 1.3 |
| I-6 Glyoxylic Acid | 0.83 | 0.34 | 1.3 |
| I-7 Oxalic Acid | 0.29 | 0.14 | 1.1 |
| I-8 Malonic Acid | 0.47 | 0.15 | 1.1 |
| I-9 Acetic Acid | 0.54 | 0.61 | 1.2 |

TABLE 1-continued

| | Added Compound | Amount (Parts by Weight) | Roll-Off (Relative Value) | Polishing Rate (Relative Value) |
|---|---|---|---|---|
| I-10 | Glycolic Acid | 0.69 | 0.21 | 1.4 |
| | Citric Acid | 0.10 | | |
| Comp. Ex. No. | | | | |
| I-1 | None | — | Undeterminable[#1] | 1.0 |
| I-2 | Aluminum Nitrate | 0.60 | 1.0[#2] | — |
| I-3 | Succinic Acid | 0.53 | 0.83 | — |
| I-4 | Aluminumammonium Ethylenediaminetetraacetate | 0.83 | 1.54 | — |
| I-5 | Glycine | 0.68 | 0.93 | — |

[#1]Ski jump was caused, so that the roll-off was undeterminable.
[#2]The roll-off value was 0.31 μm/μm.

It is clear from the results in Table 1 that all of the roll-off reducing agent compositions obtained in Examples I-1 to I-10 have remarkably reduced roll-off, as compared to the roll-off reducing agent composition obtained in Comparative Examples I-1 to I-5. Also, it is also found that the roll-off reducing agent compositions of Examples I-1 to I-10 each of which comprises the roll-off reducing agent of the present invention have increased polishing rates, as compared with that of Comparative Example I-1.

Further, the roll-off reducing agent composition prepared in each of Example I-4, Example I-10 and Comparative Example I-3 was subjected to polishing evaluation mentioned above for 20 repeated times, and a ratio of a twentieth relative polishing rate to the first relative polishing rate was determined as a measure for an ability of preventing pad clogging. As a result, the ratio of a twentieth relative polishing rate to the first relative polishing rate in the roll-off reducing agent composition of Example I-4 was 0.97, the ratio in the roll-off reducing agent composition of Example I-10 was 0.95, and the ratio in the composition of Comparative Example I-3 was 0.62.

It is clear from the evaluation results of ability of preventing pad clogging for Examples I-4 and I-10 and Comparative Example I-3 that Examples I-4 and I-10 exhibit little deterioration in the polishing rate as compared to that in Comparative Example I-3, thereby exhibiting an excellent ability for preventing pad clogging.

Preparation Example II-1 for Intermediate Alumina

An alumina vessel (200 mm in length×100 mm in width×100 mm in height) was charged with 100 g of pseudo-boehmite particles having an average particle size of 25 μm, a specific surface area of 250 m²/g, an alkali metal content of 0.003% by weight, and an alkaline earth metal content of 0.01% by weight. The pseudo-boehmite particles were heated in a muffle furnace at a heating rate of 50° C./minute, and baked at a baking temperature of 930° C. for 4 hours with nitrogen gas stream at a flow rate of 5 L/minute, to give an intermediate alumina. The intermediate alumina was transferred to a 2-L alumina ball-mill, and ion-exchanged water was added thereto to prepare a 30% by weight slurry. Thereafter, alumina balls of 3 mm in diameters were introduced into the ball-mill to disrupt the slurry, to prepare intermediate alumina particles. The prepared intermediate alumina particles were found to have the crystal form of γ-alumina by analysis of X-ray diffraction peaks, and had an average particle size of 0.3 μm, a specific surface area of 150 m²/g, an alkali metal content of 0.005% by weight, and an alkaline earth metal content of 0.01% by weight.

Examples II-1 to II-6 and Comparative Examples II-1 to II-5

There were mixed together an abrasive [α-alumina (purity: about 99.9%) having primary average particle size: 0.25 μm, and secondary average particle size: 0.8 μm], a roll-off reducing agent, an intermediate alumina (γ-alumina) obtained in Preparation Examples II-1, and balance ion-exchanged water, to give a composition as shown in Table 2 with stirring. Here, the pH of each composition in Examples II-1 to II-5 and Comparative Examples II-2, II-3 and II-5 was adjusted to 4.0 with an aqueous ammonia, and the pH of each composition in Comparative Examples II-1 and II-4 was adjusted to 4.0 with nitric acid, to give 100 parts by weight of each polishing composition of Examples II-1 to II-6 and Comparative Examples II-1 to II-5.

TABLE 2

| | α-Alumina (Parts by Weight) | Roll-Off Reducing Agent | Amount (Parts by Weight) | Intermediate Alumina or Alumina Sol[1)] | Amount (Parts by Weight) |
|---|---|---|---|---|---|
| Example No. | | | | | |
| II-1 | 7 | Glycolic Acid | 0.15 | Intermediate Alumina | 1 |
| II-2 | 7 | Malic Acid | 0.15 | Intermediate Alumina | 1 |
| II-3 | 7 | Tartaric Acid | 0.15 | Intermediate Alumina | 1 |
| II-4 | 7 | Malonic Acid | 0.15 | Intermediate Alumina | 1 |
| II-5 | 7 | Citric Acid | 0.15 | Intermediate Alumina | 1 |
| II-6 | 7 | Glycolic Acid | 0.15 | Intermediate Alumina | 1 |
| | | Citric Acid | 0.05 | | |

TABLE 2-continued

| | α-Alumina (Parts by Weight) | Roll-Off Reducing Agent | Amount (Parts by Weight) | Intermediate Alumina or Alumina Sol[1] | Amount (Parts by Weight) |
|---|---|---|---|---|---|
| Comparative Example No. | | | | | |
| II-1 | 7 | None | — | None | — |
| II-2 | 7 | Diammonium Ethylenediamine-tetraacetate | 0.15 | Intermediate Alumina | 1 |
| II-3 | 7 | Succinic Acid | 0.15 | Alumina Sol | 1 |
| II-4 | 7 | Gluconic Acid | 0.15 | Alumina Sol | 1 |
| II-5 | 7 | Glycolic Acid | 0.15 | Alumina Sol | 1 |

[1]Commercially available from Nissan Chemical Industries, Ltd, under the trade name of Alumina Sol-200

Using each of the resulting polishing compositions, a substrate surface made of an Ni—P plated aluminum alloy, the substrate surface having an average deviation, of all points from plane fit to test part surface Ra of 0.2 μm, as determined by the following method, a thickness of 0.8 mm and a diameter of 95 mm was polished with a double-sided processing machine under Set Conditions II for Double-Sided Processing Machine given below, to give a polished Ni—P plated, aluminum alloy substrate usable for magnetic recording media.

Set Conditions II for Double-Sided Processing Machine are as follows.

Set Conditions II for Double-Sided Processing Machine

Double-sided processing machine: double-sided processing machine, Model 9B, manufactured by SPEEDFAM CO., LTD.
Processing pressure: 9.8 kPa
Polishing Pad: "POLYTEX DG-H" (manufactured by Rodel Nitta K.K.).
Disc rotational speed: 55 r/min
Feeding flow rate for a polishing composition: 100 mL/min
Polishing time period: 4 minutes
Number of substrate introduced: 10

After polishing, the thickness of an Ni—P plated aluminum alloy substrate of Examples was determined by using a thickness tester (a laser thickness tester, commercially available from Mitsutoyo Corporation, Model LGH-110/LHC-11N). A rate of decrease in the thickness was obtained from the changes in the thickness of the aluminum alloy substrate before and after polishing, and expressed as a relative value (relative polishing rate) on the basis of the polishing rate of Comparative Example II-1.

In addition, the surface roughness (average deviation, of all points from plane fit to test part surface Ra) and pits (surface defects) of each substrate after polishing were determined in accordance with the following methods, and roll-off was determined in the same manner as above. Here, the average deviation, of all points from plane fit to test part surface Ra was obtained as a relative value (relative roughness) on the basis of the surface roughness of Comparative Example II-1. In addition, the roll-off was obtained as a relative value (relative roll-off) on the basis of the roll-off value of Comparative Example II-2. The results are shown in Table 3.

[Average Deviation, of All Points from Plane Fit to Test Part Surface Ra]

Determined under the following conditions by using Talystep commercially available from Rank Taylor-Hobson Limited
Size of tip end of profilometer: 25 μm×25 μm
By-pass filter: 80 μm
Measurement length: 0.64 mm

[Surface Defects (Pits)]

The surface of each substrate was observed with an optical microscope (differential interference microscope) at a magnification of 200 times at an interval of 30° for 12 locations, and the number of pits was counted and evaluated as follows:
S: 0
A: 1 to 3
B: 4 to 10
C: 10 or more

TABLE 3

| | Evaluation of Properties | | | |
|---|---|---|---|---|
| | Polishing Rate (—) | Surface Roughness (—) | Surface Defects (Pits) | Roll-Off (—) |
| Example No. | | | | |
| II-1 | 1.6 | 0.68 | S | 0.21 |
| II-2 | 1.7 | 0.65 | S | 0.23 |
| II-3 | 1.6 | 0.70 | S | 0.24 |
| II-4 | 1.4 | 0.65 | S | 0.25 |
| II-5 | 1.7 | 0.72 | S | 0.25 |
| II-6 | 1.6 | 0.70 | S | 0.20 |
| Comparative Example No. | | | | |
| II-1 | 1 | 1 | C | Undeterminable[*1] |
| II-2 | 1.6 | 0.70 | S | 1[*2] |
| II-3 | 1.5 | 1.2 | A | 0.83 |
| II-4 | 1.4 | 1.1 | A | 0.40 |
| II-5 | 1.1 | 1.1 | A | 0.25 |

[*1]Ski jump was caused, so that the roll-off was undeterminable.
[*2]The roll-off value was 0.36 μm/μm.

It is clear from the results in Table 3 that all of the polishing compositions obtained in Examples II-1 to II-6 have high polishing rates, and especially as compared with the polishing compositions obtained in Comparative Examples II-1 to II-5, the polishing compositions obtained in Examples II-1 to II-6 have reduced surface roughness, no surface defects, and markedly reduced roll-off in the polished substrate.

Further, the polishing composition prepared in each of Example II-5, Example II-6 and Comparative Example II-3 was subjected to polishing evaluation mentioned above for 20 repeated times, and a ratio of a twentieth relative polishing rate to the first relative polishing rate was determined as a measure for an ability of preventing pad clogging. As a result, the ratio of a twentieth relative polishing rate to the first relative polishing rate in the polishing composition of Example II-5 was 0.91, the ratio in the polishing composition of Example II-6 was 0.90, and the ratio in the polishing composition of Comparative Example II-3 was 0.50.

It is clear from the evaluation results of ability of preventing pad clogging for the polishing compositions of Examples II-5 and II-6 exhibit excellent ability for preventing pad clogging, as compared with that of Comparative Example II-3.

Preparation Example III-1 for Intermediate Alumina

An alumina vessel (200 mm in length×100 mm in width×100 mm in height) was charged with 100 g of pseudo-boehmite particles having an average particle size of 15 μm, a specific surface area of 240 m$^2$/g, an alkali metal content of 0.002% by weight, and an alkaline earth metal content of 0.01% by weight. The pseudo-boehmite particles were heated in a muffle furnace at a heating rate of 50° C./minute, and baked at a baking temperature of 900° C. for 4 hours with nitrogen gas stream at a flow rate of 5 L/minute, to give an intermediate alumina. The intermediate alumina was transferred to a 2-L alumina ball-mill, and ion-exchanged water was added thereto to prepare a 30% by weight slurry. Thereafter, alumina balls of 3 mm in diameters were introduced into the ball-mill to disrupt the slurry, to prepare intermediate alumina particles. The prepared intermediate alumina particles were found to have the crystal form of γ-alumina by analysis of X-ray diffraction peaks, and had an average particle size of 0.3 μm, a specific surface area of 120 m$^2$/g, an alkali metal content of 0.003% by weight, and an alkaline earth metal content of 0.01% by weight.

Examples III-1 to III-8 and Comparative Examples III-1 to III-5

There were mixed together an abrasive [α-alumina (purity: about 99.9%) having primary average particle size: 0.25 μm, and secondary average particle size: 0.65 μm], Compounds (A), Compounds (B), Compounds (C) [an intermediate alumina (γ-alumina) obtained in Preparation Examples III-1 or an alumina sol (boehmite)], and balance ion-exchanged water, to give a composition as shown in Table 4 with stirring. Here, the pH of each composition in Examples III-1 to III-8 and Comparative Examples III-1 to III-5 was adjusted to 4.0 or 7.0 with nitric acid or an aqueous ammonia, to give 100 parts by weight of each polishing composition of Examples III-1 to III-8 and Comparative Examples III-1 to III-5.

TABLE 4

|  | α-Alumina (parts by weight) | Compounds (A) | | Compounds (B) | | Compounds (C) | | pH |
|---|---|---|---|---|---|---|---|---|
|  |  | Compound | Amount (parts by weight) | Compound | Amount (parts by weight) | Compound | Amount (parts by weight) |  |
| Ex. No. |  |  |  |  |  |  |  |  |
| III-1 | 7 | Glycolic acid | 0.15 | Aluminumammonium ethylenediaminetetraacetate | 0.8 | Intermediate Alumina | 1 | 4 |
| III-2 | 7 | Glycolic acid | 0.15 | Maleic acid | 0.5 | Intermediate Alumina | 1 | 7 |
| III-3 | 7 | Oxalic acid | 0.15 | Itaconic acid | 0.5 | Intermediate Alumina | 1 | 7 |
| III-4 | 7 | Tartaric acid | 0.15 | Fumaric acid | 0.5 | Intermediate Alumina | 1 | 7 |
| III-5 | 7 | Citric acid | 0.15 | Succinic acid | 0.5 | Intermediate Alumina | 1 | 7 |
| III-6 | 7 | Glycolic acid | 0.15 | Diammonium ethylenediamine tetraacetate | 0.8 | Alumina Sol*[1] | 1.5 | 4 |
| III-7 | 7 | Glycolic acid | 0.15 | Glycine | 0.5 | Intermediate Alumina | 1 | 7 |
| III-8 | 7 | Glycolic acid<br>Citric acid | 0.15<br>0.05 | Aluminumammonium ethylenediaminetetraacetate | 0.8 | Intermediate Alumina | 1 | 4 |
| Comp. Ex. No. |  |  |  |  |  |  |  |  |
| III-1 | 7 | None | — | None | — | None | — | 4 |
| III-2 | 7 | None | — | Aluminumammonium ethylenediaminetetraacetate | 0.8 | Intermediate Alumina | 1 | 4 |
| III-3 | 7 | Glycolic acid | 0.15 | Aluminumammonium ethylenediaminetetraacetate | 0.8 | None | — | 4 |
| III-4 | 7 | Glycolic acid | 0.15 | None | — | Intermediate Alumina | 1 | 7 |
| III-5 | 7 | None | — | Diammonium ethylenediamine tetraacetate | 0.8 | Alumina Sol*[1] | 1.5 | 4 |

*[1]Commercially available from Nissan Chemical Industries, Ltd. under the trade name of Alumina Sol-200.

Using each of the resulting polishing compositions, a substrate surface made of an Ni—P plated aluminum alloy, the substrate surface having an average deviation, of all points from plane fit to test part surface Ra of 0.2 µm, as determined by the method described above, a thickness of 0.8 mm and a diameter of 95 mm was polished with a double-sided processing machine under Set Conditions II for Double-Sided Processing Machine given above, to give a polished Ni—P plated, aluminum alloy substrate usable for magnetic recording media.

After polishing, the thickness of the aluminum alloy substrate of Examples was determined by using a thickness tester (a laser thickness tester, commercially available from Mitsutoyo Corporation, Model LGH-110/LHC-11N). A rate of decrease in the thickness was obtained from the changes in the thickness of an Ni—P plated aluminum alloy substrate before and after polishing, and expressed as a relative value (relative polishing rate) of Comparative Example III-1.

In addition, the surface roughness (average deviation, of all points from plane fit to test part surface Ra), pits, and roll-off of each substrate after polishing were determined in the same manner in accordance with the methods described above. Here, the average deviation, of all points from plane fit to test part surface Ra was obtained as a relative value (relative roughness) on the basis of the surface roughness of Comparative Example III-1. In addition, the roll-off was obtained as a relative value (relative roll-off) on the basis of the roll-off value of Comparative Example III-2. The results are shown in Table 5.

TABLE 5

| | Evaluation of Properties | | | |
|---|---|---|---|---|
| | Polishing Rate (—) | Surface Roughness (—) | Surface Defects (Pits) | Roll-Off (—) |
| Ex. No. | | | | |
| III-1 | 2.3 | 0.70 | S | 0.26 |
| III-2 | 2.5 | 0.75 | S | 0.28 |
| III-3 | 2.3 | 0.67 | S | 0.30 |
| III-4 | 2.4 | 0.71 | S | 0.31 |
| III-5 | 2.3 | 0.68 | S | 0.31 |
| III-6 | 1.8 | 0.95 | A | 0.31 |
| III-7 | 2.0 | 0.83 | S | 0.42 |
| III-8 | 2.4 | 0.74 | S | 0.25 |
| Comp. Ex. No. | | | | |
| III-1 | 1.0 | 1.0 | C | Undeterminable* |
| III-2 | 2.2 | 0.76 | S | 1.0 |
| III-3 | 1.8 | 1.80 | B | 0.29 |
| III-4 | 1.4 | 0.65 | S | 0.28 |
| III-5 | 1.7 | 0.92 | A | 1.05 |

*Undeterminable due to generation of ski jump.

It is clear from the results in Table 5 that all of the polishing compositions obtained in Examples III-1 to III-8 are excellent, simultaneously satisfying all of effects of increasing polishing rates, effects of reducing surface defects such as pits, effects of reducing surface roughness and effects of reducing roll-off, as compared with those of the polishing compositions obtained in Comparative Examples III-1 to III-5.

Further, the polishing composition prepared in each of Example III-5, Example III-8 and Comparative Example III-2 was subjected to polishing evaluation mentioned above for 20 repeated times, and a ratio of a twentieth relative polishing rate to the first relative polishing rate was determined as a measure for an ability of preventing pad clogging. As a result, the ratio of a twentieth relative polishing rate to the first relative polishing rate in the polishing composition of Example III-5 was 0.91, the ratio in the polishing composition of Example III-8 was 0.90, and the ratio in the polishing composition of Comparative Example III-2 was 0.48.

It is clear from the evaluation results of ability of preventing pad clogging for the polishing compositions of Examples III-5 and III-8 exhibit excellent ability for preventing pad clogging, as compared with that of Comparative Example III-2.

Examples IV-1 to IV-7 and Comparative Examples IV-1 to IV-3

There were mixed together an abrasive [α-alumina (purity: about 99.9%) having primary average particle size: 0.23 µm, and secondary average particle size: 0.6 µm], Compounds (A), Compounds (B), and ion-exchanged water, and other components as occasion demands, to give a composition as shown in Table 6 with stirring. Here, the pH of each composition in Examples IV-1 to IV-7 and Comparative Examples IV-2 to IV-3 was adjusted with nitric acid, and the pH of the composition in Comparative Example IV-1 was adjusted with an aqueous ammonia, to a pH of 4.0 or 7.0, to give 100 parts by weight of each polishing composition of Examples IV-1 to IV-7 and Comparative Examples IV-1 to IV-3.

Using each of the resulting polishing compositions, a substrate surface made of an Ni—P plated aluminum alloy, the substrate surface having an average deviation, of all points from plane fit to test part surface Ra of 0.2 µm, as determined by the method described above, a thickness of 0.8 mm and a diameter of 95 mm was polished with a double-sided processing machine under Set Conditions II for Double-Sided Processing Machine given above, to give a polished Ni—P plated, aluminum alloy substrate usable for magnetic recording media.

After polishing, the thickness of the aluminum alloy substrate of Examples was determined by using a thickness tester (a laser thickness tester, commercially available from Mitsutoyo Corporation, Model LGH-110/LHC-11N). A rate of decrease in the thickness was obtained from the changes in the thickness of an Ni—P plated aluminum alloy substrate before and after polishing, and expressed as a relative value (relative polishing rate) of Comparative Example IV-1.

In addition, the surface roughness (average deviation, of all points from plane fit to test part surface Ra) and roll-off of each substrate after polishing were determined in the same manner in accordance with the methods described above. Here, the roll-off was obtained as a relative value (relative roll-off) on the basis of the roll-off value of Comparative Example IV-2. The results are shown in Table 6.

TABLE 6

| | α-Alumina (parts by weight) | Compounds (A) Compound | Amount (parts by weight) | Compounds (B) Compound | Amount (parts by weight) | Others (parts by weight) | pH | Polishing Rate | Roll-Off |
|---|---|---|---|---|---|---|---|---|---|
| Ex. No. | | | | | | | | | |
| IV-1 | 7 | Glycolic acid | 0.15 | Aluminumammonium ethylenediamine-tetraacetate | 0.8 | — | 4 | 1.9 | 0.21 |
| IV-2 | 7 | Glycolic acid | 0.15 | Maleic acid | 0.5 | — | 7 | 2.1 | 0.22 |
| IV-3 | 7 | Tartaric acid | 0.15 | Itaconic acid | 0.5 | — | 7 | 1.9 | 0.24 |
| IV-4 | 7 | Malonic acid | 0.15 | Fumaric acid | 0.5 | — | 7 | 1.9 | 0.27 |
| IV-5 | 7 | Citric acid | 0.15 | Diglycolic acid | 0.5 | — | 7 | 2.0 | 0.24 |
| IV-6 | 7 | Glycolic acid | 0.15 | Diammonium ethylenediamine-tetraacetate | 0.8 | — | 4 | 1.9 | 0.25 |
| IV-7 | 7 | Glycolic acid Citric acid | 0.15 0.05 | Maleic acid | 0.5 | — | 7 | 2.0 | 0.21 |
| Comparative Examples | | | | | | | | | |
| IV-1 | 7 | None | — | None | — | — | 4 | 1 | Undeterminable[1] |
| IV-2 | 7 | None | — | Aluminumammonium ethylenediamine-tetraacetate | 0.8 | — | 4 | 1.8 | 1[3] |
| IV-3 | 7 | None | — | Succinic acid | 0.6 | Alumina Sol[2] (0.4) | 4 | 1.5 | 0.90 |

[1] Undeterminable due to generation of ski jump.
[2] Commercially available from Nissan Chemical Industries, Ltd. under the trade name of Alumina Sol-200.
[3] The roll-off value was 0.37 μm/μm.

It is clear from the results in Table 6 that all of the polishing compositions obtained in Examples IV-1 to IV-7 have high polishing rates, and markedly reduced roll-off in the polished substrate, as compared with the polishing compositions obtained in Comparative Examples IV-1 to IV-3.

Further, the polishing composition prepared in each of Example IV-5, Example IV-7 and Comparative Example IV-3 was subjected to polishing evaluation mentioned above for 20 repeated times, and a ratio of a twentieth relative polishing rate to the first relative polishing rate was determined as a measure for an ability of preventing pad clogging. As a result, the ratio of a twentieth relative polishing rate to the first relative polishing rate in the polishing composition of Example IV-5 was 0.95, the ratio in the polishing composition of Example IV-7 was 0.92, and the ratio in the polishing composition of Comparative Example IV-3 was 0.55.

It is clear from the evaluation results of ability of preventing pad clogging for the polishing compositions of Examples IV-5 and IV-7 exhibit excellent ability for preventing pad clogging, as compared with that of Comparative Example IV-3.

By polishing a substrate for precision parts or the like with the roll-off reducing agent of the present invention, there can be exhibited excellent effects that the roll-off of the polished substrate can be remarkably reduced, and that the polishing rate can be increased.

In addition, by polishing a substrate for precision parts or the like with the polishing composition of the present invention, there can be exhibited excellent effects that the roll-off and the surface roughness of the polished substrate are remarkably reduced.

EQUIVALENTS

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing a substrate comprising a step of polishing a substrate to be polished with a polishing composition comprising:
    water;
    an abrasive;
    a roll-off reducing agent comprising one or more compounds selected from the group consisting of carboxylic acids having 2 to 20 carbon atoms having either hydroxyl group or groups or SH group or groups, monocarboxylic acids having 1 to 20 carbon atoms, and dicarboxylic acids having 2 to 3 carbon atoms, and salts thereof; and
    an intermediate alumina
    wherein said abrasive is α-alumina and the amount of the intermediate alumina is from 1 to 100 parts by weight based on 100 parts by weight of α-alumina wherein said abrasive differs from an intermediate alumina.

2. A process for producing a substrate comprising a step of polishing a substrate to be polished with a polishing composition comprising:
    (A) one or more compounds selected from the group consisting of carboxylic acids having 2 to 20 carbon atoms having either hydroxyl group or groups or SH group or groups, monocarboxylic acids having 1 to 20 carbon atoms, and dicarboxylic acids having 2 to 3 carbon atoms, and salts thereof;

(B) one or more compounds selected from the group consisting of polycarboxylic acids having 4 or more carbon atoms and having neither hydroxyl group or groups nor SH group or groups, aminopolycarboxylic acids, amino acids and salts thereof; and (C) one or more compounds selected from the group consisting of an intermediate alumina and an alumina sol;

an abrasive; and water wherein said abrasive is α-alumina and the amount of the intermediate alumina is from 1 to 100 parts by weight based on 100 parts by weight of α-alumina wherein said abrasive differs from an intermediate alumina.

3. The process of claim 2, wherein the intermediate alumina and the alumina sol in Compounds (C) have a specific surface area of from 30 to 300 m²/g and an average particle size of 0.01 to 5 μm.

4. The process of claim 2, wherein the intermediate alumina is prepared from aluminum hydroxide and/or alumina sol, each having a specific surface area of 10 m²/g or more and a content of an alkali metal and a content of an alkaline earth metal of 0.1% by weight or less.

5. A process for producing a substrate comprising a step of polishing a substrate to be polished with a polishing composition comprising:

(A) one or more compounds selected from the group consisting of carboxylic acids having 2 to 20 carbon atoms having either hydroxyl group or groups or SN group or groups, monocarboxylic acids having 1 to 20 carbon atoms, and dicarboxylic acids having 2 to 3 carbon atoms, and salts thereof; and (B) one or more compounds selected from the group consisting of polycarboxylic acids having 4 or more carbon atoms and having neither hydroxyl group or groups nor SH group or groups, aminopolycarboxylic acids, amino acids and salts thereof;

an abrasive; and water wherein said abrasive is α-alumina and the amount of the intermediate alumina is from 1 to 100 parts by weight based on 100 parts by weight of α-alumina wherein said abrasive differs from an intermediate alumina.

6. The process of claim 5, wherein one or more compounds of Compounds (A) are selected from the group consisting of carboxylic acids having 2 to 20 carbon atoms having either hydroxyl group or groups or SH group or groups, and dicarboxylic acids having 2 to 3 carbon atoms, and salts thereof, and wherein one or more compounds of Compounds (B) are selected from the group consisting of polycarboxylic acids having 4 or more carbon atoms and having neither hydroxyl group or groups nor SH group or groups, aminopolycarboxylic acids, and salts thereof.

7. The process of claim 5, wherein one or more compounds of Compounds (A) are selected from the group consisting of oxalic acid, malonic acid, glycolic acid, lactic acid, malic acid, glyoxylic acid, tartaric acid, citric acid, gluconic acid, and salts thereof, and wherein one or more compounds of Compounds (B) are selected from the group consisting of succinic acid, maleic acid, fumaric acid, citraconic acid, itaconic acid, tricarballylic acid, diglycolic acid, ethylene-diamine tetra acetic acid, diethylene triamine pentaacetic acid, and salts thereof.

8. The process according to claim 1, wherein said intermediate alumina is selected from the group consisting of γ-alumina, δ-alumina, θ-alumina, η-alumina, κ-alumina, and mixtures thereof.

9. The process according to claim 2, wherein said intermediate alumina is selected from the group consisting of γ-alumina, δ-alumina, θ-alumina, η-alumina, κ-alumina, and mixtures thereof.

10. The process of claim 2, wherein one or more compounds of Compounds (A) are selected from the group consisting of oxalic acid, malonic acid, glycolic acid, lactic acid, malic acid, glyoxylic acid, tartaric acid, citric acid, gluconic acid, and salts thereof, and wherein one or more compounds of Compounds (B) are selected from the group consisting of succinic acid, maleic acid, fumaric acid, citraconic acid, itaconic acid, tricarballylic acid, diglycolic acid, ethylene-diamine tetra acetic acid, diethylene triamine pentaacetic acid, and salts thereof.

11. The process of claim 2, wherein one or more compounds of Compounds (A) are selected form the group consisting of oxalic acid, malonic acid, glycolic acid, tartaric acid, citric acid, and salts thereof, and wherein one or more compounds of Compounds (B) are selected from the group consisting of succinic acid, maleic acid, fumaric acid, itaconic acid, ethylene-diamine tetra acetic acid, diethylene triamine pentaacetic acid, and salts thereof.

12. The process of claim 5, wherein one or more compounds of Compounds (A) are selected from the group consisting of oxalic acid, malonic acid, glycolic acid, tartaric acid, citric acid, and salts thereof, and wherein one or more compounds of Compounds (B) are selected from the group consisting of succinic acid, maleic acid, fumaric acid, itaconic acid, ethylene-diamine tetra acetic acid, diethylene triamine pentaacetic acid, and salts thereof.

13. The process of claim 1 wherein the amount of the intermediate alumina is from 2 to 70 parts by weight based on 100 parts by weight of α-alumina.

14. The process of claim 1 wherein the amount of the intermediate alumina is from 4 to 40 parts by weight based on 100 parts by weight of α-alumina.

* * * * *